(12) United States Patent
Chen et al.

(10) Patent No.: US 11,642,844 B2
(45) Date of Patent: May 9, 2023

(54) THREE-DIMENSIONAL PRINTING WITH ADHESION PROMOTERS

(71) Applicant: Hewlett-Packard Development Company, L.P., Spring, TX (US)

(72) Inventors: Tienteh Chen, San Diego, CA (US); Shannon Reuben Woodruff, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/417,069

(22) PCT Filed: Aug. 6, 2019

(86) PCT No.: PCT/US2019/045292
§ 371 (c)(1),
(2) Date: Jun. 21, 2021

(87) PCT Pub. No.: WO2021/025686
PCT Pub. Date: Feb. 11, 2021

(65) Prior Publication Data
US 2022/0168951 A1    Jun. 2, 2022

(51) Int. Cl.
*B29C 64/165* (2017.01)
*B33Y 10/00* (2015.01)
(Continued)

(52) U.S. Cl.
CPC .......... *B29C 64/165* (2017.08); *B29C 64/188* (2017.08); *B29C 64/295* (2017.08);
(Continued)

(58) Field of Classification Search
CPC ..... B29C 64/165; B29C 64/188; B22F 10/14; B33Y 10/00; B33Y 70/00; B33Y 70/10
See application file for complete search history.

(56) References Cited

U.S. PATENT DOCUMENTS

| | | | |
|---|---|---|---|
| 9,466,544 B2 | 10/2016 | Uehling | |
| 2005/0049739 A1* | 3/2005 | Kramer | B33Y 10/00 700/198 |

(Continued)

FOREIGN PATENT DOCUMENTS

CN        107245314        10/2017

OTHER PUBLICATIONS

"Malgorzata K., Wlodarczyk-Biegun et. al., "Printability Study of Metal Ion Crosslinked PEG-catechol Based Inks", BioRxiv Preprint, Apr. 2019".

(Continued)

*Primary Examiner* — Mary Lynn F Theisen
(74) *Attorney, Agent, or Firm* — HP Inc. Patent Department

(57) ABSTRACT

The present disclosure describes multi-fluid kits for three-dimensional printing, three-dimensional printing kits, and methods of three-dimensional printing. In one example, a multi-fluid kit for three-dimensional printing can include a binder agent and an adhesion promoter agent. The binder agent can include water and latex particles in an amount from about 5 wt % to about 30 wt % based on the total weight of the binder agent. The adhesion promoter can include water and an adhesion promoter that includes catechol or a non-polymeric catechol derivative.

15 Claims, 3 Drawing Sheets

(51) Int. Cl.
  *B33Y 70/10*   (2020.01)
  *B29C 64/188*  (2017.01)
  *B29C 64/295*  (2017.01)
  *B33Y 30/00*   (2015.01)
  *B33Y 40/20*   (2020.01)

(52) U.S. Cl.
  CPC ............ *B33Y 10/00* (2014.12); *B33Y 30/00* (2014.12); *B33Y 40/20* (2020.01); *B33Y 70/10* (2020.01)

(56) References Cited

U.S. PATENT DOCUMENTS

| | | |
|---|---|---|
| 2017/0066936 A1 | 3/2017 | Lee et al. |
| 2019/0106673 A1 | 4/2019 | Skardal |
| 2019/0111479 A1 | 4/2019 | Kasperchik et al. |
| 2020/0324470 A1* | 10/2020 | Walker .................. B29C 64/188 |
| 2021/0147665 A1* | 5/2021 | Reidy .................. B22F 3/1021 |
| 2021/0317241 A1* | 10/2021 | Grießer .................. B29C 64/00 |
| 2021/0394265 A1* | 12/2021 | Rushkin .................. B22F 10/14 |

OTHER PUBLICATIONS

Daiheon Lee et. al., "Chitosan-cathechol: a Writable Bioink Under Serum Culture Media"; Biomaterials Science, Issue 5, 2018.

* cited by examiner

THREE-DIMENSIONAL PRINTING WITH ADHESION PROMOTERS

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of build material. This is unlike other machining processes, which often rely upon the removal of material to create the final part. Some 3D printing methods use chemical binders or adhesives to bind build materials together. Other 3D printing methods involve sintering or partial sintering, melting, etc., of the build material. For some 3D printing methods, melting or partial melting of build material may be accomplished using heat-assisted extrusion, and for some other materials (e.g., polymerizable materials), curing may be accomplished using, for example, ultra-violet light or infrared light.

DETAILED DESCRIPTION

Figure 1:
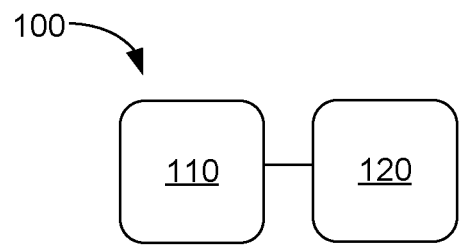
FIG. 1 schematically illustrates an example multi-fluid kit for three-dimensional printing in accordance with the present disclosure.

The present disclosure describes materials and methods that can be used to form three-dimensional (3D) printed articles from a metal powder build material. Generally, the 3D printing processes described herein can be used to form a green body of metal particle bound together with a binder. The green body can subsequently be sintered to form a durable metal 3D printed article. In one example, a multi-fluid kit for three-dimensional printing can include a binder agent and an adhesion promoter agent. The binder agent can include water and latex particles in an amount from about 5 wt % to about 30 wt % based on the total weight of the binder agent. The adhesion promoter agent can include water and an adhesion promoter including catechol or a non-polymeric catechol derivative. In some examples, the adhesion promoter can be included in the adhesion promoter agent in an amount from about 0.1 wt % to about 5 wt %. In certain examples, the catechol or non-polymeric catechol derivative can have the general formula:

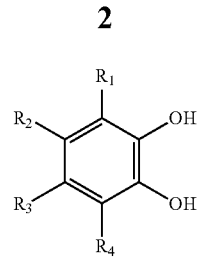

wherein $R_1$ through $R_4$ are independently hydrogen, halogen, linear or branched $C_1$-$C_{10}$ alkyl, $C_1$-$C_{10}$ alkylamino, $NH_2$, $NO_2$, carboxyl, $(CH_2)_n COOH$, acetyl, haloacetyl, or sulfonate, wherein n is an integer from 1 to 10. In further examples, the binder agent can also include a high boiling point solvent having a boiling point from about 110° C. to about 300° C. in an amount from about 0.5 wt % to about 50 wt % with respect to the total weight of the binder agent. In other examples, the latex particles can include a polymerized monomer selected from the group consisting of acrylates, methacrylates, styrene, and combinations thereof, and a polymerized acid monomer selected from the group consisting of acrylic acid, methacrylic acid, and a combination thereof.

The present disclosure also describes three-dimensional printing kits. In one example, a three-dimensional printing kit can include a particulate build material, a binder agent to selectively apply to the particulate build material, and an adhesion promoter. The particulate build material can include from about 80 wt % to about 100 wt % metal particles. The binder agent can include water and latex particles in an amount from about 5 wt % to about 30 wt % based on the total weight of the binder agent. The adhesion promoter can include catechol or a non-polymeric catechol derivative. The adhesion promoter can be included either in the binder agent or in a separate adhesion promoter agent to selectively apply to the particulate build material. In some examples, the adhesion promoter can be included in the binder agent in an amount from about 0.05 wt % to about 2 wt % with respect to the total weight of the binder agent. In other examples, the adhesion promoter can be included in the separate adhesion promoter agent in an amount from about 0.1 wt % to about 5 wt % with respect to the total weight of the adhesion promoter agent, and the adhesion promoter agent can also include water. In further examples, the catechol or non-polymeric catechol derivative can have the general formula:

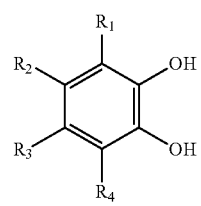

wherein $R_1$ through $R_4$ are independently hydrogen, halogen, linear or branched $Ci_1$-$C_{10}$ alkyl, $C_1$-$C_{10}$ alkylamino, $NH_2$, $NO_2$, carboxyl, $(CH_2)_n COOH$, acetyl, haloacetyl, or sulfonate, wherein n is an integer from 1 to 10. In still further examples, the binder agent can also include a high boiling point solvent having a boiling point from about 110° C. to about 300° C. in an amount from about 0.5 wt % to about 50 wt % with respect to the total weight of the binder agent. In other examples, the latex particles can include a polymerized monomer selected from the group consisting of acrylates, methacrylates, styrene, and combinations thereof, and a polymerized acid monomer selected from the group consisting of acrylic acid, methacrylic acid, and a combination thereof.

The present disclosure also describes methods of three-dimensional printing. In one example, a method of three-dimensional printing can include iteratively applying individual build material layers of a particulate build material including from about 80 wt % to about 100 wt % metal particles. The method can also include selectively applying water, latex particles, and an adhesion promoter to the individual build material layers based on a 3D object model to define layers of a 3D green body object. The adhesion promoter can include catechol or a non-polymeric catechol derivative. The 3D green body object can be heated to drive off water and further solidify the 3D green body object. In some examples, the latex particles and the adhesion promoter can be selectively applied by ejecting a binder agent that includes water, the latex particles, and the adhesion promoter. The binder agent can include the latex particles in an amount from about 5 wt % to about 30 wt % with respect to the total weight of the binder agent, and the adhesion promoter in an amount from about 0.05 wt % to about 2 wt % with respect to the total weight of the binder agent. In other examples, the latex particles can be selectively applied by ejecting a binder agent that includes water and the latex particles in an amount from about 5 wt % to about 30 wt % with respect to the total weight of the binder agent, and the adhesion promoter can be selectively applied by ejecting a separate adhesion promoter agent including water and the adhesion promoter in an amount from about 0.1 wt % to about 5 wt % with respect to the total weight of the adhesion promoter agent. In further examples, the heating can include heating at from about 100° C. to about 250° C. for about 5 minutes to about 8 hours.

The materials and processes described herein can be used to form a 3D green body object made up particulate build material held together by a binder. In certain examples, the 3D green body can be formed by depositing thin layers of the particulate build material in a powder bed and then jetting a binder agent onto the layers to form individual slices of the 3D green body. After forming one slice of the 3D green body in this way, a new layer of particulate build material can be deposited on the powder bed and the next slice can be formed by jetting the binder agent, and this can be repeated until a complete 3D green body is formed. The binder agent can include latex particles as mentioned above. In some examples, the binder can form a polymeric matrix holding the metal particles of the particulate build material together. In some cases, after forming all the slices of the green body in the powder bed, the green body can be strengthened by heating to a fusing temperature to fuse the latex particles together to form the polymeric matrix. Without being bound to a particular mechanism, in some examples the latex particles may dissolve in solvents included in the binder agent, and then the solvents may evaporate at the fusing temperature to leave behind a polymeric matrix. In other examples, the latex particles may melt and soften sufficiently to coalesce and form a polymeric matrix at the fusing temperature. The fusing temperature can be lower than the sintering temperature at which the metal particles of the particulate build material will sinter together. Accordingly, the final 3D green body object can include discrete metal particles bound together by a polymer matrix.

Generally, the 3D green body object can have sufficient strength to hold its own shape until the time that the 3D green body object is sintered to form a final metal 3D printed article. In further examples, the 3D green body object can be sufficiently strong to withstand any processing and handling that occurs before sintering. For example, the 3D green body object can be removed from the powder bed and cleaned to remove any loose build material particles that have become caked or weakly attached to the surface of the 3D green body object. In some examples, this cleaning can be performed by brushing, sandblasting, or other methods. If the 3D green body object does not have sufficient strength that these processes can break off parts of the 3D green body object, destroy surface details of the 3D green body object, and so on.

Without being bound to a specific mechanism, in some cases the failure point in a broken 3D green body object can be the interface between the metal particles and the polymer binder. In some cases the binder can have poor adhesion with the surfaces of the metal particles so that the bond between the metal particles and the binder can break. The materials and methods described herein can increase the strength of the 3D green body object by including an adhesion promoter. The adhesion promoter can include catechol or a non-polymeric catechol derivative. Catechol is an organic compound having the following structure:

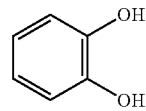

Non-polymeric catechol derivatives can include molecules that include the catechol structure with additional functional groups. In some examples, catechol derivatives can retain the two hydroxyl groups of the catechol structure, and any additional functional groups can be attached to other carbons on the benzene ring of the catechol structure.

In some examples, the adhesion promoter can increase adhesion between the polymeric binder and the metal particles to strengthen the 3D green body object. In certain examples, green body objects with the adhesion promoter have been found to be nearly twice as strong as 3D green body objects that include the same binder without the adhesion promoter. The catechol or non-polymeric catechol derivative may increase adhesion by forming hydrogen bonds with the surface of the metal particles and interacting with the polymeric binder through Van der Waals interaction. The green body objects formed using the methods described herein can have increased strength and can be removed from the powder bed and prepared for final sintering with less risk of breakage. Final sintering can include exposing the green body object to heat to sinter the metal particles of the particulate build material together and form a sintered 3D printed object. The temperature at which the green body object is heated to fuse the metal particles and form the final 3D printed object is referred to herein as the fusing temperature. In some examples, the polymeric binder can thermally decompose or be burned off during the sintering process.

It is noted that when discussing the three-dimensional printing kits, the multi-fluid kits, and methods of three-dimensional printing herein, these discussions can be considered applicable to one another whether or not they are explicitly discussed in the context of that example. Thus, for example, when discussing a binder agent related to a three-dimensional printing kit, such disclosure is also relevant to and directly supported in the context of multi-fluid kits, methods of three-dimensional printing, vice versa, etc.

It is also understood that terms used herein will take on their ordinary meaning in the relevant technical field unless specified otherwise. In some instances, there are terms defined more specifically throughout the specification or included at the end of the present specification, and thus, these terms have a meaning as described herein.

Particulate Build Materials

In examples of the 3D printing kits and methods disclosed herein, the build material can include any particulate build material that includes from about 80 wt % to about 100 wt % metal particles based on the total weight of the particulate build material. In other examples, the metal particles can be present in the particulate build material at from about 90 wt % to about 100 wt %, from about 95 wt % to about 100 wt %, or at about 100 wt %. In an example, the build material particles can be a single phase metallic material composed of one element. In this example, the fusing temperature may be below the melting point of the single element. In another example, the build material particles can include two or more elements, which may be in the form of a single phase metallic alloy or a multiple phase metallic alloy. In these other examples, fusing can generally occur over a range of temperatures. With respect to alloys, materials with a metal alloyed to a non-metal (such as a metal-metalloid alloy) can be used as well.

In some examples, the particulate build material can include particles of aluminum, titanium, copper, cobalt, chromium, nickel, vanadium, tungsten, tungsten carbide, tantalum, molybdenum, magnesium, gold, silver, ferrous alloy, stainless steel, steel, alloys thereof, or admixtures thereof. Specific alloy examples can include AlSi 10Mg, 2xxx series aluminum, 4xxx series aluminum, CoCr MP1, CoCr SP2, maraging steel MS1, hastelloy C, hastelloy X, nickel alloy HX, inconel IN625, inconel IN718, stainless steel GP1, stainless steel 17-4PH, stainless steel 316L, stainless steel 430L titanium 6AI4V, and titanium 6AI-4V ELI7.

The temperature(s) at which the metallic particles of the particulate build material fuse together is/are above the temperature of the environment in which the patterning portion of the 3D printing method is performed, e.g., patterning at from about 18° C. to about 300° C. and fusing at from about 500° C. to about 3,500° C. In some examples, the metallic build material particles may have a melting point ranging from about 500° C. to about 3,500° C. In other examples, the metallic build material particles may be an alloy having a range of melting points.

The particle size of the particulate build material can be similarly sized or differently sized. In one example, the D50 particle size of the particulate build material can range from 0.5 µm to 200 µm. In some examples, the particles can have a D50 particle size distribution value that can range from about 1 µm to about 150 µm, from about 1 µm to about 100 µm, from about 1 µm to about 50 µm, from about 4 µm to about 150 µm, from about 4 µm to about 100 µm, from about 4 µm to about 50 µm, etc. Individual particle sizes can be outside of these ranges, as the "D50 particle size" is defined as the particle size at which about half of the particles are larger than the D50 particle size and about half of the other particles are smaller than the D50 particle size (by weight based on the metal particle content of the particulate build material). As used herein, particle size refers to the value of the diameter of spherical particles or in particles that are not spherical can refer to the longest dimension of that particle. The shape of the particles of the particulate build material can be spherical, non-spherical, random shapes, or a combination thereof. The particle size can be presented as a Gaussian distribution or a Gaussian-like distribution (or normal or normal-like distribution). Gaussian-like distributions are distribution curves that may appear Gaussian in their distribution curve shape, but which can be slightly skewed in one direction or the other (toward the smaller end or toward the larger end of the particle size distribution range). That being stated, an example Gaussian-like distribution of the metal particles can be characterized generally using "D10," "D50," and "D90" particle size distribution values, where D10 refers to the particle size at the $10^{th}$ percentile, D50 refers to the particle size at the $50^{th}$ percentile, and D90 refers to the particle size at the $90^{th}$ percentile. For example, a D50 value of 25 µm means that 50% of the particles (by number) have a particle size greater than 25 µm and 50% of the particles have a particle size less than 25 µm. Particle size distribution values may not be related to Gaussian distribution curves, but in one example of the present disclosure, the metal particles can have a Gaussian distribution, or more typically a Gaussian-like distribution with offset peaks at about D50. In practice, true Gaussian distributions are not typically present, as some skewing can be present, but still, the Gaussian-like distribution can be considered to be referred to as "Gaussian" as typically used.

Adhesion Promoter

To bind the particulate build material on a layer by layer basis and form a 3D green body object, binder agent with latex particles can be used. In some examples herein, the tensile strength of the green body formed using the particulate build material and the latex particles can be enhanced by using an adhesion promoter that includes catechol or a non-polymeric catechol derivative.

In particular, catechol or non-polymeric catechol derivative adhesion promoters have been found to be effective in interacting or otherwise providing adhesion promotion between the latex particles and particulate build material. Thus, in many instances, the inclusion of the adhesion promoter applied to layers of particulate build material along with latex particles can enhance the tensile strength of a 3D green body object. This is particularly useful when the green body, once formed through an additive layer by layer printing process, is to be moved after preparation into an oven for fusing, e.g., sintering, annealing, melting, etc. Without sufficient tensile strength, 3D green body objects can become damaged during the move from the (non-solidified) particulate build material to the fusing oven, particularly if the part is large or complex.

In some examples, the catechol or non-polymeric catechol derivative adhesion promoter can be included in a binder agent together with a latex binder. In other examples, the catechol or non-polymeric catechol derivative adhesion promoter can be in a separate adhesion promoter agent. In some cases, the adhesion promoter can be included in a fluid agent within a certain concentration range. The concentration of the adhesion promoter can be adjusted to ensure that the fluid agent containing the adhesion promoter is jettable using fluid ejectors that may be used in the 3D printing process. In certain examples, fluid agents with higher concentrations of additives can be more difficult to jet. Therefore, if the adhesion promoter is included in the binder agent then the overall concentration of adhesion promoter may be reduced compared to when the adhesion promoter is in a separate adhesion promoter agent. In certain specific examples, the adhesion promoter can be included in the binder agent in an amount from about 0.05 wt % to about 2 wt % with respect to the total weight of the binder agent. In other examples, the adhesion promoter can be included in the binder agent in an amount from about 0.1 wt % to about 1.5 wt % or from about 0.2 wt % to about 1 wt %. In further examples, the adhesion promoter can be included in a separate adhesion promoter agent that does not include the latex binder. The adhesion promoter can be included in the separate adhesion promoter agent in an amount from about 0.1 wt % to about 5 wt %. In still further examples, the adhesion promoter can be included in the adhesion promoter agent in an amount from about 0.2 wt % to about 3 wt % or from about 0.4 wt % to about 2 wt %.

The adhesion promoter can include catechol or a non-polymeric catechol derivative. As used herein, "non-polymeric catechol derivative" can refer to molecules that include the catechol structure with additional groups attached. The non-polymeric catechol derivative can be a small molecule with a single catechol structure in the molecule, as opposed to a polymer chain that includes multiple catechol groups. Additionally, in some examples, the two hydroxyl groups of the catechol structure can be present and unmodified in the non-polymeric catechol derivative. In some examples, the non-polymeric catechol derivative can have a molecular weight from about 110 g/mol to about 600 g/mol.

In some examples, the adhesion promoter can include a non-polymeric catechol derivative having the following general formula:

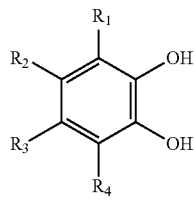

wherein $R_1$ through $R_4$ are independently hydrogen, halogen, linear or branched $C_1$-$C_{10}$ alkyl, $C_1$-$C_{10}$ alkylamino, $NH_2$, $NO_2$, carboxyl, $(CH_2)_n COOH$, acetyl, haloacetyl, or sulfonate, wherein n is an integer from 1 to 10.

In certain examples, $R_1$, $R_2$, and $R_3$ can be hydrogen and $R_4$ can be another substituent. In further examples, $R_1$, $R_2$, and $R_4$ can be hydrogen and $R_3$ can be another substituent. In still further examples, two of the $R_1$ through $R_4$ groups can be hydrogen, and the other two can independently be other substituents. For example, $R_1$ and $R_2$ can be hydrogen while $R_3$ and $R_4$ are other substituents. In another example, $R_1$ and $R_3$ can be hydrogen while $R_2$ and $R_4$ are other substituents. Alternatively, $R_1$ and $R_4$ can be hydrogen while $R_2$ and $R_3$ are other substituents. Conversely, $R_2$ and $R_3$ can be hydrogen while $R_1$ and $R_4$ are other substituents. In further examples, any one of the R groups can be hydrogen and the remaining three of the R groups can be substituents other the hydrogen. In still further examples, all of the R groups can be a substituent other than hydrogen.

In the above examples, the $R_1$ through $R_4$ groups can independently include linear or branched $C_1$-$C_{10}$ alkyl groups in some examples. In specific examples, groups $R_1$ through $R_4$ can include a linear $C_1$-$C_5$ alkyl group. In other examples, $R_1$ through $R_4$ can include a branched $C_1$-$C_5$ alkyl group. In certain examples, one of the R groups can be methyl, ethyl, propyl, isopropyl, or tert-butyl.

The R groups can also include other functional groups. In certain examples, one of the R groups can be carboxyl, $(CH_2)_n COOH$, acetyl, chloroacetyl, $NO_2$, chloro, bromo, $NH_2$, alkylamine, or sulfonate, where n is an integer from 1 to 10.

A few non-limiting examples of catechol and non-polymeric catechol derivatives are shown in Table 1, as follows:

TABLE 1

| Catechol and Non-Polymeric Catechol Derivatives | |
|---|---|
| Catechol | OH, OH |
| 4-Methylcatechol | OH, OH, H₃C |
| 2,3-Dihydroxybenzoic Acid | O, OH, OH, OH |
| 3,4-Dihydroxybenzoic Acid | HO, O, OH, HO |
| 3,4-Dihydroxyphenylacetic Acid | OH, O, HO, OH |
| 4-Nitrocatechol | OH, OH, NO₂ |
| 4-Chloroacetyl Catechol | O, Cl, HO, OH |
| 3,4-Dihydroxyacetophenone | O, CH₃, OH, OH |

TABLE 1-continued

Catechol and Non-Polymeric Catechol Derivatives

4-Tert-Butylpyrocatechol

Tiron Monohydrate

4-Chlorocatechol

4-Bromocatechol

4-Ethylcatechol

4-Isopropylcatechol

4-Aminocatechol

3-Chlorocatechol

3-Bromocatechol

3-Ethylcatechol

3-Isopropylcatechol

3-Aminocatechol

In particular examples, the catechol or non-polymeric catechol derivative can be catechol, 4-methylcatechol, 3,4-dihydroxybenzoic acid, 3,4-dihydroxyphenylacetic acid, or 2,3-dihydroxybenzoic acid.

Latex Particles

To bind the particulate build material together during the build process to form a 3D green body object, binder agent can be applied to the particulate build material on a layer by layer basis. Heat (below metal sintering temperatures) can be applied on a layer by layer basis, upon formation of a plurality of layers of the green body, or in some cases, after the green body is fully formed. The binder agent can include latex particles as a binding agent and an aqueous liquid vehicle. In some examples, the binder agent can also include a catechol or non-polymeric catechol derivative adhesion promoter. If the adhesion promoter is not present in the binder agent, then there can be a separate adhesion promoter agent present that contains the adhesion promoter. Thus, description related to the adhesion promoter is relevant to the binder agent when the adhesion promoter is included in a common aqueous liquid vehicle with the latex particles.

Referring now specifically to the latex particles that can be used in a binder agent to pattern build material to form a 3D green body object, and ultimately a fused 3D object, the latex particles can be present based on a total weight of the binder agent at from about 5 wt % to about 30 wt %, from about 10 wt % to about 25 wt %, from about 12 wt % to about 22 wt %, from about 15 wt % to about 20 wt %, from about 10 wt % to about 20 wt %, or from about 6 wt % to about 18 wt %.

The latex particles can be a polymer that can have different morphologies. In one example, the latex particles can include two different copolymer compositions, which may be fully separated core-shell polymers, partially occluded mixtures, or comingled as a polymer solution. In another example, the latex particles can be individual spherical particles containing polymer compositions of hydrophilic (hard) component(s) and/or hydrophobic (soft) component(s) that can be interdispersed. In one example, the interdispersion can be according to IPN (interpenetrating networks). In yet another example, the latex particles can be composed of a hydrophobic core surrounded by a continuous or discontinuous hydrophilic shell. For example, the particle morphology can resemble a raspberry, in which a hydrophobic core can be surrounded by several smaller hydrophilic particles that can be attached to the core. In yet another example, the latex particles can include 2, 3, or 4 or more relatively large polymer particles that can be attached to one another or can surround a smaller polymer core. In a further example, the latex particles can have a single phase morphology that can be partially occluded, can be multiple-lobed, or can include any combination of any of the morphologies disclosed herein.

In some examples, the latex particles can be heteropolymers or copolymers. As used herein, a heteropolymer can include a hydrophobic component and a hydrophilic component. A heteropolymer can include a hydrophobic component that can include from about 65% to about 99.9% (by weight of the heteropolymer), and a hydrophilic component that can include from about 0.1% to about 35% (by weight of the heteropolymer). In one example, the hydrophobic component can have a lower glass transition temperature than the hydrophilic component.

In some examples, the latex particles can be composed of a polymerization or co-polymerization of acrylic monomers, styrene monomers, or a combination thereof. Example monomers can include, $C_1$-$C_{20}$ linear or branched alkyl (meth)acrylate, alicyclic (meth)acrylate, alkyl acrylate, styrene, methyl styrene, polyol (meth)acrylate, hydroxyethyl (meth)acrylate, (meth)acrylic acid, or a combination thereof. In one specific class of examples, the latex particles can be a styrene (meth)acrylate copolymer. The term "(meth)acrylate" or "(meth)acrylic acid" or the like refers to monomers, copolymerized monomers, etc., that can either be acrylate or methacrylate (or a combination of both), or acrylic acid or methacrylic acid (or a combination of both). In some examples, the terms "(meth)acrylate" and "(meth)acrylic acid" can be used interchangeably, as acrylates and methacrylates are salts and esters of acrylic acid and methacrylic acid, respectively. Furthermore, mention of one compound over another can be a function of pH. Furthermore, even if the monomer used to form the polymer was in the form of a (meth)acrylic acid during preparation, pH modifications during preparation or subsequently when added to an ejectable fluid, such as a binder agent, can impact the nature of the moiety as well (acid form vs. salt or ester form). Thus, a monomer or a moiety of a polymer described as (meth) acrylic acid or as (meth)acrylate should not be read so rigidly as to not consider relative pH levels, ester chemistry, and other general organic chemistry concepts. In still another example, the latex particles can include a copolymer with copolymerized methyl methacrylate being present at about 50 wt % or greater, or copolymerized styrene being present at about 50 wt % or greater. Both can be present, with one or the other at about 50 wt % or greater in a more specific example.

In other examples, the latex particles in the binder agent include polymerized monomers of vinyl, vinyl chloride, vinylidene chloride, vinyl ester, acrylate, methacrylate, styrene, ethylene, maleate esters, fumarate esters, itaconate esters, α-methyl styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, 2-ethylhexyl acrylate, 2-ethylhexyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, isobornyl methacrylate, cyclohexyl methacrylate, trimethyl cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, isobornyl acrylate, dimethyl maleate, dioctyl maleate, acetoacetoxyethyl methacrylate, diacetone acrylamide, N-vinyl imidazole, N-vinylcarbazole, N-Vinyl-caprolactam, combinations thereof, derivatives thereof, or mixtures thereof. These monomers include low glass transition temperature (Tg) monomers that can be used to form the hydrophobic component of a heteropolymer.

In other examples, a composition of the latex particles can include acidic monomers. In some examples, the acidic monomer content can range from 0.1 wt % to 15 wt %, from 0.5 wt % to 12 wt %, or from 1 wt % to 10 wt % of the latex particles with the remainder of the latex particle being composed of non-acidic monomers. Example acidic monomers can include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, or mixtures thereof. These acidic monomers are higher Tg hydrophilic monomers, than the low Tg monomers above, and can be used to form the hydrophilic component of a heteropolymer. Other examples of high Tg hydrophilic monomers can include acrylamide, methacrylamide, monohydroxylated monomers, monoethoxylated monomers, polyhydroxylated monomers, or polyethoxylated monomers.

In an example, the selected monomer(s) can be polymerized to form a polymer, heteropolymer, or copolymer with a co-polymerizable dispersing agent. The co-polymerizable dispersing agent can be a polyoxyethylene compound, such as a HITENOL® compound (Montello Inc.) e.g., polyoxyethylene alkylphenyl ether ammonium sulfate, sodium polyoxyethylene alkylether sulfuric ester, polyoxyethylene styrenated phenyl ether ammonium sulfate, or mixtures thereof. Any suitable polymerization process can be used. In some examples, an aqueous dispersion of latex particles can be produced by emulsion polymerization or co-polymerization of any of the above monomers.

In one example, the latex particles can be prepared by polymerizing high Tg hydrophilic monomers to form the high Tg hydrophilic component and attaching the high Tg hydrophilic component onto the surface of the low Tg hydrophobic component. In another example, the latex particles can be prepared by polymerizing the low Tg hydrophobic monomers and the high Tg hydrophilic monomers at a ratio of the low Tg hydrophobic monomers to the high Tg hydrophilic monomers that ranges from 5:95 to 30:70. In this example, the low Tg hydrophobic monomers can dissolve in the high Tg hydrophilic monomers. In yet another example, the latex particles can be prepared by polymerizing the low Tg hydrophobic monomers, then adding the high Tg hydrophilic monomers. In this example, the polymerization process can cause a higher concentration of the high Tg hydrophilic monomers to polymerize at or near the surface of the low Tg hydrophobic component. In still another example, the latex particles can be prepared by copolymerizing the low Tg hydrophobic monomers and the high Tg hydrophilic monomers, then adding additional high Tg hydrophilic monomers. In this example, the copolymerization process can cause a higher concentration of the high Tg hydrophilic monomers to copolymerize at or near the surface of the low Tg hydrophobic component.

Other suitable techniques, specifically for generating a core-shell structure, can include grafting a hydrophilic shell onto the surface of a hydrophobic core, copolymerizing hydrophobic and hydrophilic monomers using ratios that lead to a more hydrophilic shell, adding hydrophilic monomer (or excess hydrophilic monomer) toward the end of the copolymerization process so there is a higher concentration of hydrophilic monomer copolymerized at or near the surface, or any other method can be used to generate a more hydrophilic shell relative to the core.

In one specific example, the low Tg hydrophobic monomers can be selected from the group consisting of C4 to C8 alkyl acrylate monomers, C4 to C8 alkyl methacrylate monomers, styrene monomers, substituted methyl styrene monomers, vinyl monomers, vinyl ester monomers, and combinations thereof; and the high Tg hydrophilic monomers can be selected from acidic monomers, unsubstituted amide monomers, alcoholic acrylate monomers, alcoholic methacrylate monomers, C1 to C2 alkyl acrylate monomers, C1 to C2 alkyl methacrylate monomers, and combinations thereof. The resulting polymer latex particles can exhibit a core-shell structure, a mixed or intermingled polymeric structure, or some other morphology.

In certain examples, the latex polymer can include polymerized monomer selected from the group consisting of acrylates, methacrylates, styrene, and combinations thereof, and polymerized acid monomer selected from the group consisting of acrylic acid, methacrylic acid, and a combination thereof. In a particular example, the latex polymer can include a styrene (meth)acrylate copolymer.

In some examples, the latex polymer can have a weight average molecular weight (Mw) that can range from about 5,000 Mw to about 2,000,000 Mw. In yet other examples, the weight average molecular weight can range from about 100,000 Mw to about 1,000,000 Mw, from about 100,000 Mw to about 500,000 Mw, from about 150,000 Mw to about 300,000 Mw, or from about 50,000 Mw to about 250,000 Mw. Weight average molecular weight (Mw) can be measured by Gel Permeation Chromatography with polystyrene standard.

In some examples, the latex polymer particles can be latent and can be activated by heat (applied iteratively or after green body formation). In these instances, the activation temperature can correspond to the minimum film formation temperature (MFFT) or a glass transition temperature (Tg) which can be greater than ambient temperature. As mentioned herein, "ambient temperature" may refer to room temperature (e.g., ranging about 18° C. to about 22° C.). In one example, the latex polymer particles can have a MFFT or Tg that can be about 15° C. or more greater than ambient temperature. In another example, the MFFT or the Tg of the bulk material (e.g., the more hydrophobic portion) of the latex polymer particles can range from about 25° C. to about 200° C. In another example, the latex particles can have a MFFT or Tg ranging from about 40° C. to about 120° C. In yet another example, the latex polymer particles can have a MFFT or Tg ranging from about 50° C. to about 150° C. In a further example, the latex polymer particles can have a Tg that can range from about −20° C. to about 130° C., or in another example from about 60° C. to about 105° C. At a temperature above the MFFT or the Tg of a latent latex polymer particle, the polymer particles can coalesce and can bind materials.

The latex particles can have a particle size that can be jetted via thermal ejection or printing, piezoelectric ejection or printing, drop-on-demand ejection or printing, continuous ejection or printing, etc. In an example, the particle size of the latex particles can range from about 10 nm to about 400 nm. In yet other examples, a particle size of the latex particles can range from about 10 nm to about 300 nm, from about 50 nm to about 250 nm, from about 100 nm to about 300 nm, or from about 25 nm to about 250 nm.

In the various binder agents described herein, these fluids can be aqueous fluids, and can include liquid vehicle ingredients, such as water, organic co-solvents, biocides, viscosity modifiers, pH adjusters, sequestering agents, preservatives, latex polymer, etc. More detail regarding the liquid vehicles that can be used is provided hereinafter.

Binder Agents and Adhesion Promoter Agents

Turning now to the fluids that can be prepared in accordance with the present disclosure, in addition to the particulate build material, the kits and methods described herein can include a binder agent including latex particles, and in some instances a separate adhesion promoter agent. If the binder agent also includes the catechol or non-polymeric catechol derivative adhesion promoter described herein, then there may or may not be a separate adhesion promoter agent. If, however, there is no adhesion promoter in the binder agent, then the 3D printing kits and methods of 3D printing described herein can include an adhesion promoter agent that contains the catechol or non-polymeric catechol derivative adhesion promoter. In other words, the adhesion promoter and the latex particles are included in the system either together in a common binder agent, or in separate fluids as a binder agent and an adhesion promoter agent, or the adhesion promoter can be included in the binder agent and there may still further be a separate adhesion promoter agent.

Regardless of whether the binder agent delivers both the latex particles and the adhesion promoter to the particulate build material, or whether the binder agent delivers the latex particles and a separate adhesion promoter agent delivers the adhesion promoter, there can be certain weight ratios of latex particles to adhesion promoter within a layer of the particulate build material that can be effective for enhancing tensile strength of the 3D green body object prior to fusing. For example, the weight ratio of latex particles to the catechol or non-polymeric catechol derivative adhesion promoter when applied to the particulate build material can be from about 4:1 to about 100:1, from about 10:1 to about 80:1, or from about 15:1 to about 70:1. If there are two fluids used, namely a binder agent and an adhesion promoter agent, these fluids can be formulated to deliver the latex particles from the binder agent and the adhesion promoter from the adhesion promoter agent at a binder agent to adhesion promoter agent weight ratio of about 5:1 to about 1:5, from about 2:1 to about 1:2, or at about 1:1. The respective fluids can be formulated to deliver volumes of fluid sufficient so that some mixing can occur when applied to the particulate build material.

Regardless of where the latex particles reside relative to the adhesion promoter, these fluids can be aqueous fluids in the form of aqueous dispersions or solutions carried by an aqueous liquid vehicle. The aqueous liquid vehicles can make up about 60 wt % to about 90 wt % of the binder agent (with or without the catechol or non-polymeric catechol derivative adhesion promoter), and if there is a separate adhesion promoter agent, the aqueous liquid vehicle can make up about 80 wt % to about 99.9 wt % of the adhesion promoter agent. In other examples, the aqueous liquid vehicle can be included in the binder agent at from about 60 wt % to about 85 wt %, from about 60 wt % to about 80 wt %, from about 75 wt % to about 90 wt %, or from about 70 wt % to about 80 wt %, based on a total weight of the binder agent. In further detail, if there is a separate adhesion promoter agent, the aqueous liquid vehicle can be included in this fluid at from about 80 wt % to about 99 wt %, from about 80 wt % to about 95 wt %, from about 90 wt % to about 98 wt %, or from about 85 wt % to about 95 wt %, based on a total weight of the adhesion promoter agent.

In some examples, the aqueous liquid vehicle(s) can include water, co-solvents, dispersing agents, biocides, viscosity modifiers, pH adjusters, sequestering agents, preservatives, and the like. In one example, water can be present at from about 30 wt % to 100 wt % of the liquid vehicle component—excluding latex binder and adhesion promoter—based on a total weight of the aqueous liquid vehicle. In other examples, the water can be present at from about 60 wt % to about 95 wt %, from about 75 wt % to 100 wt %, or from about 80 wt % to about 99 wt %, based on a total weight of the aqueous liquid vehicle.

The co-solvent can be present at from about 0.5 wt % to about 50 wt % in the aqueous liquid vehicle, based on a total weight of the binder agent or the total weight of the adhesion promoter agent. In other examples, the co-solvent can be present at from about 5 wt % to about 40 wt % or from about 20 wt % to about 30 wt %. In some examples, the co-solvent can be a high boiling point solvent, which can have a boiling point of about 110° C. or greater. In some examples, the high boiling point co-solvent can have a boiling point from about 110° C. to about 300° C. Example co-solvents can include aliphatic alcohols, aromatic alcohols, alkyl diols, glycol ethers, polyglycol ethers, 2-pyrrolidinones, caprolactams, formamides, acetamides, long chain alcohols, and combinations thereof. For example, the co-solvent can include aliphatic alcohols with a —CH$_2$OH group, secondary aliphatic alcohols, 1,2-alcohols, 1,3-alcohols, 1,5-alcohols, ethylene glycol alkyl ethers, propylene glycol alkyl ethers, C6 to C12 homologs of polyethylene glycol alkyl ethers, N-alkyl caprolactams, unsubstituted caprolactams, both substituted and unsubstituted formamides, both substituted and unsubstituted acetamides, combinations thereof, and the like. Other example organic co-solvents can include propyleneglycol ether, dipropyleneglycol monomethyl ether, dipropyleneglycol monopropyl ether, dipropyleneglycol monobutyl ether, tripropyleneglycol monomethyl ether, tripropyleneglycol monobutyl ether, dipropyleneglycol monophenyl ether, 2-pyrrolidinone, 2-methyl pyrrolidone, 2-ethyl pyrrolidone, 2-methyl-1,3-propanediol, and combinations thereof.

If a surfactant is included, examples can include SURFYNOL® SEF, SURFYNOL® 104, or SURFYNOL® 440 (Evonik Industries AG, Germany); CRODAFOS™ N3 Acid or BRIJ® O10 (Croda International Plc., Great Britain); TERGITOL® TMN6, TERGITOL® 15S5, TERGITOL® 15S7, DOWFAX® 2A1, or DOWFAX® 8390 (Dow, USA); or a combination thereof. The surfactant or combinations of surfactants can be present in the binder agent and/or the adhesion promoter agent at from about 0.1 wt % to about 5 wt % in its respective fluid based on the total fluid content weight, and in some examples, can be present at from about 0.5 wt % to about 2 wt %. With respect to antimicrobials, any compound suitable to inhibit the growth of harmful microorganisms can be included. These additives may be biocides, fungicides, and other microbial agents. Examples of suitable microbial agents can include, but are not limited to, NUOSEPT® (Troy, Corp.), UCARCIDE™, KORDEK™, ROCIMA™, KATHON™ (all available from The Dow Chemical Co.), VANCIDE® (R.T. Vanderbilt Co.), PROXEL® (Arch Chemicals), ACTICIDE® B20 and ACTICIDE® M20 and ACTICIDE® MBL (blends of 2-methyl-4-isothiazolin-3-one (MIT), 1,2-benzisothiazolin-3-one (BIT), and Bronopol (Thor Chemicals); AXIDE™ (Planet Chemical); NIPACIDE™ (Clariant), etc. Sequestering agents such as EDTA (ethylene diamine tetra acetic acid) may be included to eliminate the deleterious effects of heavy metal impurities, and buffer solutions may be used to control the pH of the ink. Viscosity modifiers and buffers may also be present, as well as other additives to modify properties of the respective fluids.

In some examples, the aqueous liquid vehicle(s) can include from about 0.1 wt % to about 1 wt % of an anti-kogation agent, based on a total weight percentage of the binder agent or adhesion promoter agent. Kogation refers to the deposit of dried solids on a printhead. An anti-kogation agent can be included to prevent the buildup of dried solids on the printhead. Examples of suitable anti-kogation agents can include oleth-3-phosphate (commercially available as CRODAFOS™ O3A or CRODAFOS™ N-3 acid), dextran 500 k, CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc.

Multi-Fluid Kits, Three-Dimensional Printing Kits, and Methods of Three-Dimensional Printing In further detail, as shown in FIG. 1, an example multi-fluid kit for three-dimensional printing 100 can include a binder agent 110 and an adhesion promoter agent 120. The binder agent can include water and latex particles in an amount from about 5 wt % to about 30 wt % based on the total weight of the binder agent. The adhesion promoter agent can include water and an adhesion promoter that includes catechol or a non-polymeric catechol derivative. In various examples, the binder agent and the adhesion promoter agent can also include any of the ingredients described above. For example, the latex particles in the binder agent can have any of the components and properties described above. The adhesion promoter can be catechol or any of the non-polymeric catechol derivatives described above. Both the binder agent and the adhesion promoter agent can also include an aqueous liquid vehicle and any of the components thereof as described above.

Figure 2:
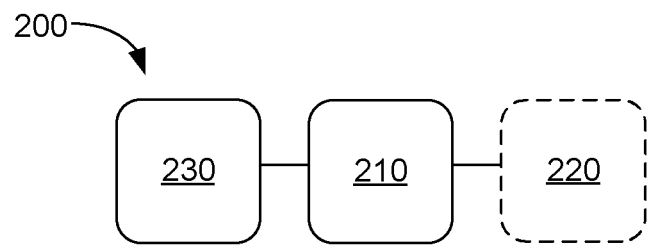
FIG. 2 schematically illustrates an example three-dimensional printing kit in accordance with the present disclosure.

FIG. 2 shows a schematic diagram of an example three-dimensional printing kit 200. The kit can include a particulate build material 230 including from about 80 wt % to 100 wt % metal particles based on the total weight of the particulate build material; and a binder agent 210 including water and latex particles in an amount of from about 5 wt % to about 30 wt % based on the total weight of the binder agent. In one example, the binder agent can also include a catechol or non-polymeric catechol derivative adhesion promoter. In another example, the kit can include the catechol or non-polymeric catechol derivative adhesion promoter in a separate fluid, namely an adhesion promoter agent 220 which includes water and the catechol or non-polymeric catechol derivative adhesion promoter. Thus, the kit can include the particulate build material, and the kit can further include one or two fluids to deliver latex particles and the adhesion promoter to the particulate build material, either in a single fluid or in a combination of multiple fluids. As a note, in examples where there is a separate adhesion promoter agent, the catechol or non-polymeric catechol derivative adhesion promoter can be in both fluids or in the adhesion promoter agent alone.

Figure 3:
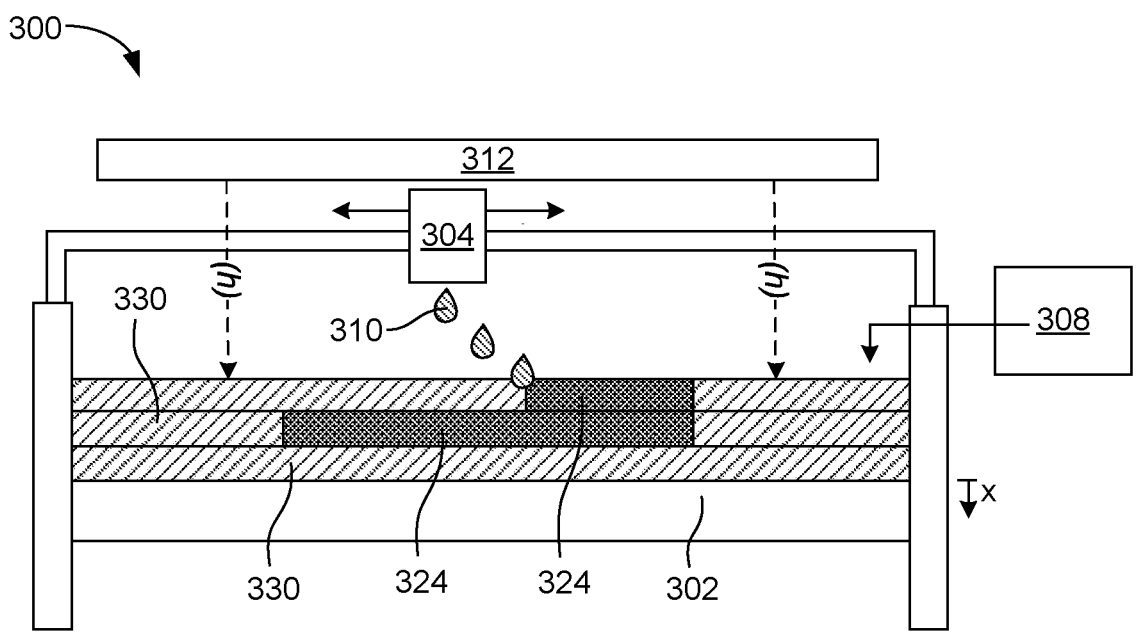
FIG. 3 graphically illustrates an example three-dimensional printing kit in example use in accordance with the present disclosure.

FIG. 3 shows an example three-dimensional printing kit 300 being used in a three-dimensional printing system to form a green body object. In this example, the particulate build material 330 is deposited from a particulate build material source 308 onto a build platform 302 where the particulate build material can be flattened or smoothed, such as by a mechanical roller or other flattening technique. In this example, the binder agent 310 includes both the latex particles and the catechol or non-polymeric catechol derivative adhesion promoter, which can be ejected onto the particulate build material from a fluid ejector 304, for example, to provide for selectively patterning the particulate build material. The binder agent can be ejected onto an area of the powder bed that corresponds to a layer of a 3D printed object, such as from a 3D object model or computer model. Heat (h) can be used, such as from a heat source 312, at the various layers (or group of layers, or after the 3D green body object is formed) to remove solvent from the binder agent and coalesce the latex particles from the binder agent, which can assist with more rapid solidification of individual layers. In one example, heat can be applied from overhead (e.g., prior to application of the next layer of particulate build material, or after multiple layers are formed, etc.), and/or can be provided by the build platform from beneath the particulate build material and/or from the particulate build material source (preheating particulate build material prior to dispensing on the build platform or previously applied 3D object layer). After individual layers are printed with binder agent, which includes both the latex particle binder material and the adhesion promoter, the build platform can be dropped a distance of (x), which can correspond to the thickness of a printed layer in one example, so that another layer of the particulate build material can be added thereon and printed with the binder agent, etc. The process can be repeated on a layer by layer basis until a green body is formed that is stable enough to move to an oven suitable for fusing, e.g., sintering, annealing, melting, or the like. The green body in this example includes a 3D object formed from solidified green body object layers 324, which include both particulate build material and binder agent that delivers the latex particles and the adhesion promoter thereto.

Figure 4:
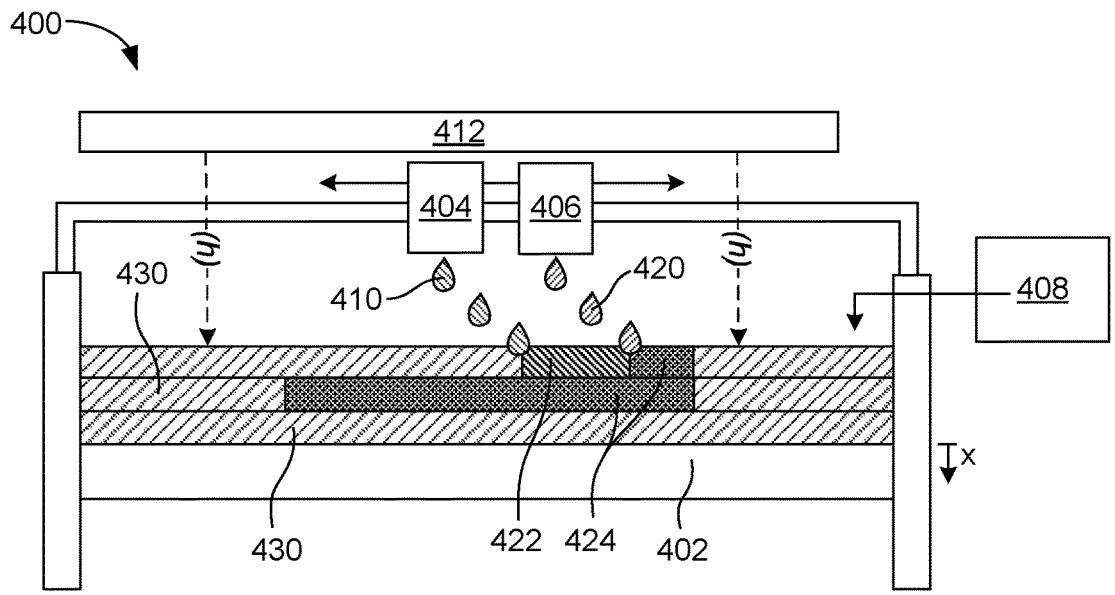
FIG. 4 graphically illustrates an alternative example three-dimensional printing kit in example use in accordance with the present disclosure.

In FIG. 4, a three-dimensional printing kit shown in the context of a printing system is shown at 400, which includes a particulate build material 430 that is deposited from a particulate build material source 408 onto a build platform 402 where it can be flattened or smoothed, such as by a mechanical roller or other flattening technique. In this example, the binder agent 410 includes the latex particles, but the catechol or non-polymeric catechol derivative adhesion promoter is delivered from a separate adhesion promoter agent 420, which can be separately ejected onto the particulate build material from a pair of fluid ejectors 404, 406, respectively. To provide for selectively patterning the particulate build material, the location of the selective printing of the binder agent and adhesion promoter agent can be to a layer corresponding to a layer of a 3D printed object, such as from a 3D object model or computer model. Heat (h) can be used, such as from a heat source 412, at the various layers (or group of layers, or after the green body is formed) to remove solvent from the binder agent and the adhesion promoter agent after application to the particulate build material, which can assist with more rapid solidification of individual layers. In one example, heat can be applied from overhead (e.g., prior to application of the next layer of particulate build material, or after multiple layers are formed, etc.), and/or can be provided by the build platform from beneath the particulate build material. After individual layers are printed with binder agent and adhesion promoter agent, the build platform can be dropped a distance of (x), which can correspond to the thickness of a printed layer so that another layer of the particulate build material can be added thereon and printed with additional binder agent and adhesion promoter agent. The process can be repeated on a layer by layer basis until a green body is formed that is stable enough to move to an oven suitable for fusing. The green body in this example includes a 3D object formed from solidified green body object layers 424, which includes the particulate build material, binder agent that delivers the latex particles, and adhesion promoter agent that delivers the adhesion promoter thereto. Also shown in this FIG. 4 is the area 422 of the powder bed onto which the binder agent has been applied but where the adhesion promoter agent has not yet been applied. Typically, the adhesion promoter agent will be applied to the same areas where the binder agent is applied. However, in some examples, the separate adhesion promoter agent can be selectively applied in portions of the area where the binder agent is applied but not in other portions of the area where the binder agent is applied. For example, it may be the case that the adhesion promoter agent could be reserved for areas where additional binding strength may be desired, and not used at other locations where the binder agent is sufficient to provide the binding strength. Small detailed portions of a 3D object may benefit from additional adhesion or tensile strength, whereas in the center or core of a green body, the latex particles may be sufficient to provide binding without the use of the adhesion promoter. Thus, the use of two separate fluids provides some additional flexibility with respect to modulating binding strength or tensile strength for use on an as needed basis.

The ejector(s) can deposit fluid(s) in a layer that corresponds to the layers of the 3D object, and can be used to form a green body 3D object in any orientation. For example, the 3D object can be printed from bottom to top, top to bottom, on its side, at an angle, or any other orientation. The orientation of the 3D object can also be formed in any orientation relative to the layering of the particulate build material. For example, the 3D object can be formed in an inverted orientation or on its side relative to the build layering within the particulate build material. The orientation of build or the orientation of the 3D object to be built within the particulate build material can be selected in advance or even by the user at the time of printing, for example.

Figure 5:
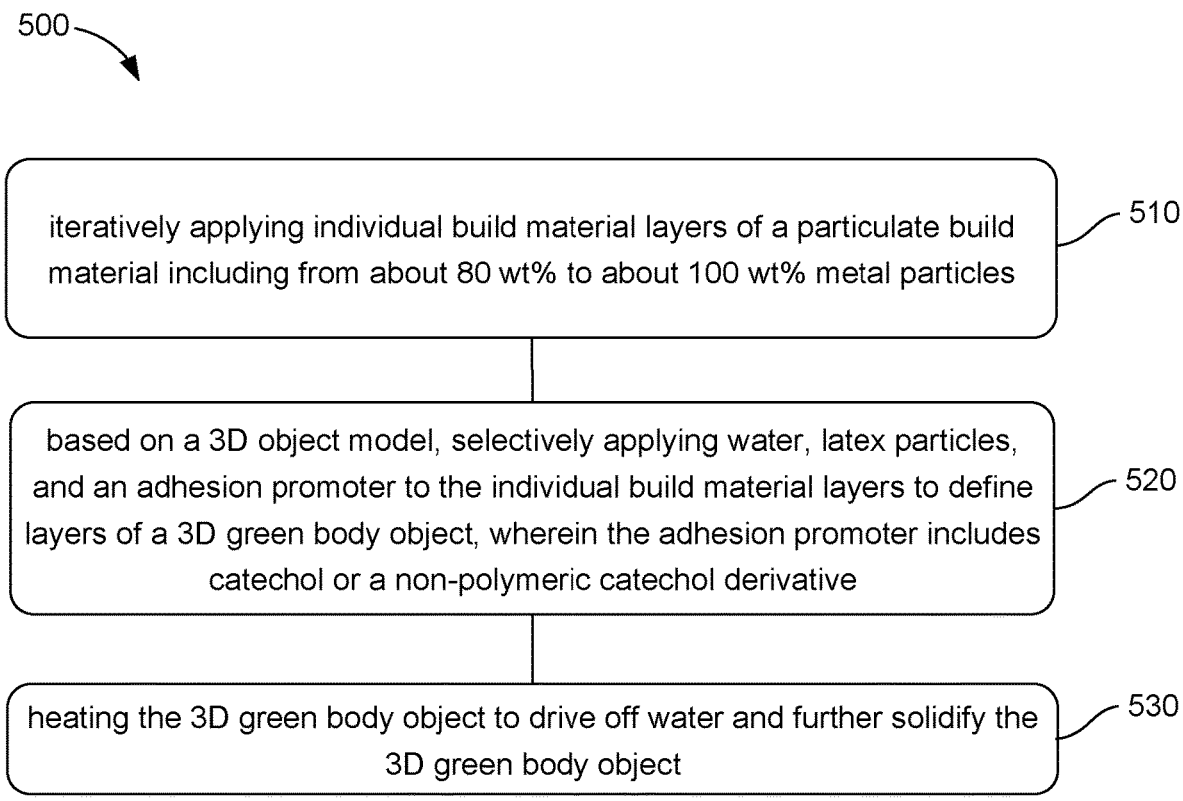
FIG. 5 is a flow diagram illustrating an example method of three-dimensional printing in accordance with the present disclosure.

In another example, as shown in FIG. 5, a method 500 of three-dimensional printing can include iteratively applying individual build material layers of a particulate build material including from about 80 wt % to about 100 wt % metal particles 510; based on a 3D object model, selectively applying water, latex particles, and an adhesion promoter to the individual build material layers to define layers of a 3D green body object, wherein the adhesion promoter includes catechol or a non-polymeric catechol derivative 520; and heating the 3D green body object to drive off water and further solidify the 3D green body object 530.

The selectively applying of the water, latex particles, and the adhesion promoter can be carried out using a single binder agent (with the water, latex particles, and adhesion promoter), or can be carried out using multiple fluids, with water and latex particles in the binder agent and water and adhesion promoter in a separate adhesion promoter agent. More specifically, in the former example, the latex particles and the adhesion promoter can be selectively applied by ejecting a binder agent including water. The latex particles can be present at an amount of from about 5 wt % to about 30 wt % based on the total weight of the binder agent, and the adhesion promoter can be present in an amount of about 0.05 wt % to about 2 wt % based on the total weight of the binder agent. In the latter example, the latex particles can be selectively applied by ejecting a binder agent including water and the latex particles in an amount of from about 5 wt % to about 30 wt % based on the total weight of the binder agent, and the adhesion promoter can be selectively applied by ejecting an adhesion promoter agent as a separate fluid relative to the binder agent. The adhesion promoter agent can likewise include water, but further, catechol or non-polymeric catechol derivative adhesion promoter can be present in an amount of about 0.1 wt % to about 5 wt % based on the total weight of the adhesion promoter agent.

Following application of the binder agent (with adhesion promoter included) or the binder agent and the adhesion promoter agent, the particulate build material and fluid(s) applied thereto can be heated to an elevated temperature to assist with solidifying the 3D green body object in preparation for moving to a fusing oven. In one example, heating can be carried out at from about 100° C. to about 250° C., about 120° C. to about 220° C., or about 150° C. to about 200° C. for time sufficient to solidify or stabilize the green body for movement to a fusing oven. Time frames for heating individual layers may be short, e.g., from about 0.5 second to about 120 seconds, for example. If heating the green body after it is fully formed, time frames can vary as well, depending on size of the green body, e.g., large objects with a smaller surface to volume ratio may take longer to drive off enough fluid to stabilize the green body than a smaller object with a larger surface to volume ratio. That stated, time frames for heating the green body after formation can be from about 5 minutes to about 8 hours, or from about 5 minutes to about 2 hours, or from about 30 minutes to about 3 hours. In many cases, individual layers can be heated during the build, and furthermore, additional heating can occur after the green body is fully formed. In other words, one goal may be to generate a green body object that is stable enough to move after formation to a fusing oven. With the use of the adhesion promoter with the latex particles, stability may be easier to achieve than with systems that do not use both components. In one specific example, it may be efficient to not fully cure every individual layer prior to applying the next green body layer, but rather coalesce the latex particles during printing (with perhaps some curing), and after building the green body as a whole or after building a large portion of the green body, e.g., 25% or more of the green body part, heating the green body further while still supported within the particulate build material. Depending on the size of the green body part or large portion thereof, heating after building can occur for about 5 minutes to about 8 hours, or from about 5 minutes to about 2 hours, or from about 30 minutes to about 3 hours, for example, as mentioned previously.

Upon coalescing or otherwise binding of the particulate build material by the latex particles and the adhesion promoter, the 3D object with enhanced tensile strength can be moved to a heating device, such as a fusing oven. In one example, the heating can be a temperature ranging from about 500° C. to about 3,500° C., including at a temperature within the range where the metal particles are fused together. In another example, the temperature can range from about 600° C. to about 1,500° C., or from about 800° C. to about 1200° C. In further detail, the fusing temperature range can vary, depending on the material, but in one example, the fusing temperature can range from about 10° C. below the melting temperature of the metal particles of the particulate build material to about 50° C. below the melting temperature of the metal particles of the particulate build material. In another example, the fusing temperature can range from about 100° C. below the melting temperature of the metal particles of the particulate build material to about 200° C. below the melting temperature of the metal particles of the particulate build material. The fusing temperature can depend upon the particle size and period of time that heating occurs, e.g., at a high temperature for a sufficient time to cause particle surfaces to become physically merged or composited together. For example, a fusing temperature for stainless steel can be about 1400° C. and an example of a fusing temperature for aluminum or aluminum alloys can range from about 550° C. to about 620° C. Temperatures outside of these ranges can be used as determined on a case by case basis.

During heating in the oven, the heating device can include an inert atmosphere to avoid oxidation of the metal particles. In one example, the inert atmosphere can be oxygen-free and can include a noble gas, an inert gas, or combination thereof. For example, the inert atmosphere can include a noble gas or an inert gas selected from argon, nitrogen, helium, neon, krypton, xenon, radon, hydrogen, or a combination thereof. Upon removal of the fused 3D object from the oven and cooling (or annealing by controlling the cool down rate in the oven), the fused 3D object can be treated or polished, such as by sand blasting, bead blasting, air jetting, tumble finishing such as barrel finishing, vibratory finishing, or a combination thereof. Tumble or vibratory finishing techniques can be performed wet (involving liquid lubricants, cleaners, or abrasives) or dry.

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range.

As used herein, "devoid" refers to a numerical quantity that can be zero or can be substantially zero, e.g., a quantity may be permissible in trace amounts, such as up to 0.1 wt % of a formulation or composition.

As used herein, the term "green" when referring to a green part, green body, 3D green body object, green body layer, etc. refers to any intermediate structure that has been solidified and/or cured (prior to heat fusing), furthermore, a green body object can include particulate build material, latex particles, and adhesion promoter. The latex particles can be used to bind the particulate build material together, and the adhesion promoter can be present at locations where the latex particles are deposited or at a plurality of locations where the latex particles are applied. The term "green body" generally is used to refer to a multi-layered object that is (weakly) bound together, but upon some water removal, can exhibit sufficient tensile strength to be moved to a fusing oven, for example. It is to be understood that any build material that is not patterned with binder agent is not considered to be part of the green body, even if it is adjacent to or surrounds the green body. For example, unprinted particulate build material acts to support the green body while contained therein, but the particulate build material is not part of the green body unless it is printed with binder agent (or binder agent along with an adhesion promoter agent) to generate a solidified part prior to fusing.

As used herein, the terms "3D part," "3D object," or the like, refers to the target 3D object that is being built, and can be a green body 3D object or a fused 3D object, depending on the context. However, in some instances, for clarity, the 3D object can be referred to as a "fused" 3D object, indicating it has been fused, e.g., sintered, annealed, melted, etc., or a "green body," "3D green body object," or "green" 3D object, indicating it has been solidified or in the process of solidification sufficient for movement, but not yet heat fused.

"Binder agent" refers to a fluid that includes water and latex particles that are effective for binding layers of particulate build material when forming a green body. The binder agent is typically applied to form a 3D green body object, and in some cases, can include an adhesion promoter, particularly if there is not a separate adhesion promoter agent present.

"Adhesion promoter agent" refers to a fluid that includes water and a catechol or non-polymeric catechol derivative adhesion promoter. The adhesion promoter agent may or may not be present in a 3D printing kit or related methods of 3D printing, as the catechol or non-polymeric catechol derivative adhesion promoter may already be present in the binder agent.

The term "fluid" does not infer that the composition is free of particulate solids, but rather, can include solids dispersed therein, including carbon black pigment, latex particles, or other solids that are dispersed in the liquid vehicle of the fluid.

As used herein, "material set" or "kit" can be synonymous with and understood to include a plurality of compositions where the different compositions can be separately contained in separate containers prior to and/or during use, e.g., building a green 3D object for subsequent fusing. These compositions of the "kit" can be combined together during a 3D build process. The containers can be any type of a vessel, box, or receptacle made of any material.

The term "fuse," "fusing," "fusion," or the like refers to the joining of the material of adjacent particles of a particulate build material, such as by sintering, annealing, melting, or the like, and can include a complete fusing of adjacent particles into a common structure, e.g., melting together, or can include surface fusing where particles are not fully melted to a point of liquefaction, but which allow for individual particles of the particulate build material to become bound to one another, e.g., forming material bridges between particles at or near a point of contact.

As used herein, a plurality of items, structural elements, compositional elements, and/or materials may be presented in a common list for convenience. However, these lists should be construed as though the various members of the list are individually identified as a separate and unique member. Thus, no individual member of such list should be construed as a de facto equivalent of any other member of the same list based on their presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as if the various numerical values and sub-ranges are explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

EXAMPLES

The following illustrates examples of the present disclosure. However, it is to be understood that the following are illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Preparation of Binder Agents

To evaluate the tensile strength of various binder agents, the following binder agent formulations B0 through B6 were prepared, with the weight percent of each ingredient shown in Table 2:

TABLE 2

| | | Binder agents | | | | | |
|---|---|---|---|---|---|---|---|
| Binder agent Components | % active | B0 (control) | B1 | B2 | B3 | B4 | B5 |
| 1,2-Butandiol | as is | 26.0 | 26.0 | 26.0 | 26.0 | 26.0 | 26.0 |
| Tergito ® 15-S-7 | 100 | 0.90 | 0.90 | 0.90 | 0.90 | 0.90 | 0.90 |
| Tergitol ® TMN-6 | 90 | 0.90 | 0.90 | 0.90 | 0.90 | 0.90 | 0.90 |
| JDP Cyan H-CB Liquid | 12.72 | 0.40 | 0.40 | 0.40 | 0.40 | 0.40 | 0.40 |
| HP787 | 31.4 | 12.0 | 12.0 | 12.0 | 12.0 | 12.0 | 12.0 |

TABLE 2-continued

| | | Binder agents | | | | | |
|---|---|---|---|---|---|---|---|
| Binder agent Components | % active | B0 (control) | B1 | B2 | B3 | B4 | B5 |
| Catechol | 100 | — | 0.68 | — | — | — | — |
| 2,3-Dihydroxybenzoic Acid | 100 | — | — | 0.68 | — | — | — |
| 3,4-Dihydroxybenzoic Acid | 100 | — | — | — | 0.68 | — | — |
| 3,4-Dihydroxyphenylacetic Acid | 100 | — | — | — | — | 0.68 | — |
| 4-Methylcatechol | 100 | | | | | | 0.68 |
| Water | 100 | Balance | Bal. | Bal. | Bal. | Bal. | Bal. |

Tergitol ® is available from Sigma Aldrich (USA);
HP787 is a copolymer latex of methyl methacrylate and styrene (Tg is about 90° C. and particle size is about 200 nm);
JDP Cyan H-CB Liquid is a cyan ink that was used for visual inspection of powder mixing quality.

Example 2—Tensile Strength

Figure 6:
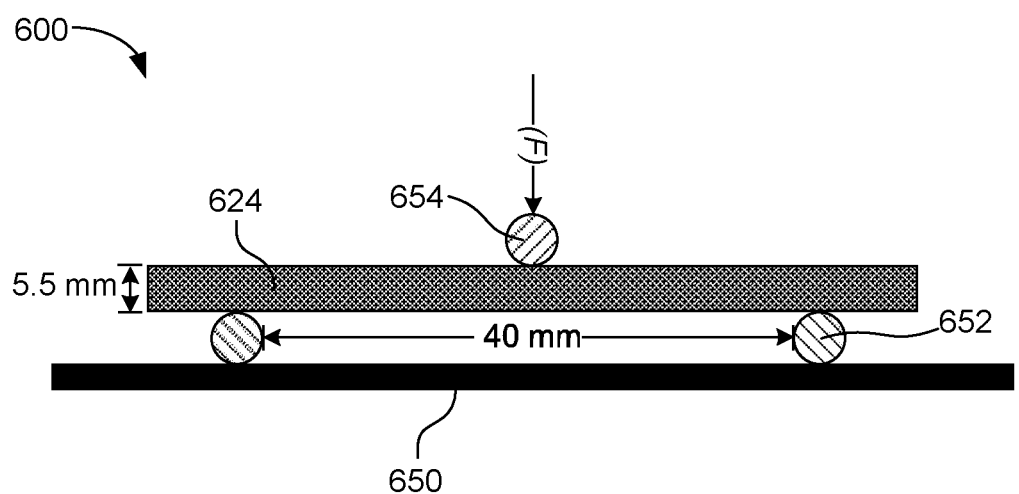
FIG. 6 illustrates an example tensile strength apparatus that can be used to evaluate tensile strength provided by various compositions for use in 3D printing in accordance with the present disclosure.

Off-line tensile strength testing was conducted, as shown at 600 in FIG. 6, where the binder agents prepared in accordance with Table 2 were used to prepare press bar samples 624, which were solidified green body samples such as those shown in FIGS. 3 and 4. The individual press bar samples included particulate build material with 100 wt % stainless steel particles having a D50 particle size of about 7 μm admixed with the various binder agents of Table 2. To prepare the individual samples for tensile strength testing, a mixture of the stainless steel particles and various binder agents were mixed in a high speed mixer to ensure homogenous mixing at a weight ratio of about 19:1 (94.8 g stainless steel particles; 5.2 g binder agent; with 1 g of water added to aid in mixing) and then the wet particles/binder homogenous mixture was dried in a vacuum oven at 30° C. for two hours to remove 80-85% of the water content, leaving a dried homogenous mixture of binder solids and stainless steel particles. 18 g of the dried homogenous mixture was poured into the opening of a press bar mold and pressed under 2000 psi for 30 seconds to form the respective press bar samples. The dimension of the press bar samples, shown at 624 in FIG. 6, was 50 mm (length) by 12 mm (width) by 5.5 mm (thickness). The individual press bar samples were then carefully separated from the mold and cured in a vacuum oven at 150° C. at 22-25 in Hg for 10 minutes with a slow stream of air to provide for removal of solvents and some or even full curing of latex binder. The individual cured press bar samples were then cooled and submitted to a 3-point bend Instron® tester, as shown by example in FIG. 6, to measure their tensile strength. The Instron® tester, available from Instron (USA), included a support 650, supporting pins 652, and a loading pin 654 which applied increasing force (F) to the individual press bar samples until the samples failed (broke under force). For the various individual press bar samples, five or more press bars were made and the average maximum tensile stress (mPa) and standard deviation were reported. The average data and standard deviations of this study are provided in Table 3.

TABLE 3

Average Maximum Tensile Stress of Cured Press Bar Samples

| Press Bar Sample ID | Adhesion Promoter | Maximum Tensile Stress (mPa) | St. Dev. of Max. Tensile Stress (mPa) |
|---|---|---|---|
| PB0 | Control | 3.24 | 0.16 |
| PB1 | Catechol | 5.74 | 0.16 |

TABLE 3-continued

Average Maximum Tensile Stress of Cured Press Bar Samples

| Press Bar Sample ID | Adhesion Promoter | Maximum Tensile Stress (mPa) | St. Dev. of Max. Tensile Stress (mPa) |
|---|---|---|---|
| PB2 | 2,3-Dihydroxybenzoic Acid | 4.80 | 0.11 |
| PB3 | 3,4-Dihydroxybenzoic Acid | 4.61 | 0.17 |
| PB4 | 3,4-Dihydroxyphenylacetic Acid | 4.17 | 0.25 |
| PB5 | 4-Methylcatechol | 5.97 | 0.38 |

Binder agent IDs from Table 2 corresponds numerically with Press Bar Sample IDs from Table 3, e.g., B0 without an adhesion promoter was used to form Press Bar Sample PB0, B1 with 0.68% catechol was used to prepare Press Bar Sample PB1, etc.

As can be seen from Table 3, all of the adhesion promoters tested were able to significantly increase the tensile strength of the press bars. The press bars with catechol and 4-methylcatechol in particular had nearly double the tensile strength of the control press bars.

What is claimed is:

1. A multi-fluid kit for three-dimensional printing comprising:
    a binder agent comprising water and latex particles in an amount from about 5 wt % to about 30 wt % based on the total weight of the binder agent; and
    an adhesion promoter agent comprising water and an adhesion promoter comprising catechol or a non-polymeric catechol derivative.

2. The multi-fluid kit of claim 1, wherein the adhesion promoter is included in the adhesion promoter agent in an amount from about 0.1 wt % to about 5 wt %.

3. The multi-fluid kit of claim 1, wherein the catechol or non-polymeric catechol derivative has the general formula:

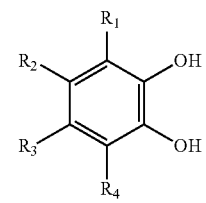

wherein $R_1$ through $R_4$ are independently hydrogen, halogen, linear or branched $C_1$-$C_{10}$ alkyl, $C_1$-$C_{10}$ alkylamino, $NH_2$, $NO_2$, carboxyl, $(CH_2)_n COOH$, acetyl, haloacetyl, or sulfonate, wherein n is an integer from 1 to 10.

4. The multi-fluid kit of claim 1, wherein the binder agent further comprises a high boiling point solvent having a boiling point from about 110° C. to about 300° C. in an amount from about 0.5 wt % to about 50 wt % with respect to the total weight of the binder agent.

5. The multi-fluid kit of claim 1, wherein the latex particles comprise:
   polymerized monomer selected from the group consisting of acrylates, methacrylates, styrene, and combinations thereof; and
   polymerized acid monomer selected from the group consisting of acrylic acid, methacrylic acid, and a combination thereof.

6. A three-dimensional printing kit comprising:
   a particulate build material comprising from about 80 wt % to about 100 wt % metal particles;
   a binder agent to selectively apply to the particulate build material, wherein the binder agent comprises water and latex particles in an amount from about 5 wt % to about 30 wt % based on the total weight of the binder agent; and
   an adhesion promoter comprising catechol or a non-polymeric catechol derivative, wherein the adhesion promoter is included in the binder agent or in a separate adhesion promoter agent to selectively apply to the particulate build material.

7. The three-dimensional printing kit of claim 6, wherein the adhesion promoter is included in the binder agent in an amount from about 0.05 wt % to about 2 wt % with respect to the total weight of the binder agent.

8. The three-dimensional printing kit of claim 6, wherein the adhesion promoter is included in the separate adhesion promoter agent in an amount from about 0.1 wt % to about 5 wt % with respect to the total weight of the adhesion promoter agent, and wherein the adhesion promoter agent further comprises water.

9. The three-dimensional printing kit of claim 6, wherein the catechol or non-polymeric catechol derivative has the general formula:

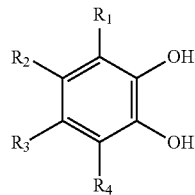

wherein $R_1$ through $R_4$ are independently hydrogen, halogen, linear or branched $C_1$-$C_{10}$ alkyl, $C_1$-$C_{10}$ alkylamino, $NH_2$, $NO_2$, carboxyl, $(CH_2)_n COOH$, acetyl, haloacetyl, or sulfonate, wherein n is an integer from 1 to 10.

10. The three-dimensional printing kit of claim 6, wherein the binder agent further comprises a high boiling point solvent having a boiling point from about 110° C. to about 300° C. in an amount from about 0.5 wt % to about 50 wt % with respect to the total weight of the binder agent.

11. The three-dimensional printing kit of claim 6, wherein the latex particles comprise:
   polymerized monomer selected from the group consisting of acrylates, methacrylates, styrene, and combinations thereof; and
   polymerized acid monomer selected from the group consisting of acrylic acid, methacrylic acid, and a combination thereof.

12. A method of three-dimensional printing comprising:
   iteratively applying individual build material layers of a particulate build material comprising from about 80 wt % to about 100 wt % metal particles;
   based on a 3D object model, selectively applying water, latex particles, and an adhesion promoter to the individual build material layers to define layers of a 3D green body object, wherein the adhesion promoter comprises catechol or a non-polymeric catechol derivative; and
   heating the 3D green body object to drive off water and further solidify the 3D green body object.

13. The method of claim 12, wherein the latex particles and the adhesion promoter are selectively applied by ejecting a binder agent comprising:
   water;
   the latex particles in an amount from about 5 wt % to about 30 wt % with respect to the total weight of the binder agent; and
   the adhesion promoter in an amount from about 0.05 wt % to about 2 wt % with respect to the total weight of the binder agent.

14. The method of claim 12, wherein the latex particles are selectively applied by ejecting a binder agent comprising water and the latex particles in an amount from about 5 wt % to about 30 wt % with respect to the total weight of the binder agent, and wherein the adhesion promoter is selectively applied by ejecting a separate adhesion promoter agent comprising water and the adhesion promoter in an amount from about 0.1 wt % to about 5 wt % with respect to the total weight of the adhesion promoter agent.

15. The method of claim 12, wherein the heating comprises heating at from about 100° C. to about 250° C. for about 5 minutes to about 8 hours.

* * * * *